(12) United States Patent
Potisek et al.

(10) Patent No.: US 9,243,088 B2
(45) Date of Patent: *Jan. 26, 2016

(54) ADDUCT

(75) Inventors: Stephanie L. Potisek, Houston, TX (US); Mark B. Wilson, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/882,662

(22) PCT Filed: Nov. 22, 2010

(86) PCT No.: PCT/US2010/057613
§ 371 (c)(1),
(2), (4) Date: Apr. 30, 2013

(87) PCT Pub. No.: WO2012/071028
PCT Pub. Date: May 31, 2012

(65) Prior Publication Data
US 2013/0225728 A1    Aug. 29, 2013

(51) Int. Cl.
*C08F 20/44* (2006.01)
*C08L 63/00* (2006.01)
*C08G 59/18* (2006.01)

(52) U.S. Cl.
CPC .............. *C08F 20/44* (2013.01); *C08G 59/186* (2013.01); *C08L 63/00* (2013.01)

(58) Field of Classification Search
USPC ............ 525/326.1, 329.3, 331.9, 333.2, 383, 525/474, 476
See application file for complete search history.

(56) References Cited

U.S. PATENT DOCUMENTS

| 2,924,580 A | | 2/1960 | Phillips et al. |
| 3,457,218 A | * | 7/1969 | Nutzel et al. .................. 524/114 |
| 5,391,628 A | * | 2/1995 | Gaillard et al. ............... 525/250 |
| 2009/0099312 A1 | | 4/2009 | Weber et al. |

FOREIGN PATENT DOCUMENTS

| WO | WO-2010077485 A1 * | 7/2010 |
| WO | 2011059633 | 5/2011 |
| WO | 2011063327 | 5/2011 |

OTHER PUBLICATIONS

Johari, G.P. et al. Journal of Polymer Science Part B: Polymer Physics vol. 26 pp. 1923-1930 (Aug. 1988).*

* cited by examiner

*Primary Examiner* — Irina S Zemel
*Assistant Examiner* — Jeffrey Lenihan

(57) ABSTRACT

An adduct of (a) at least one divinylarene dioxide, and (b) at least one end-functionalized polymer. For example, the adduct may be beneficially used as a toughening agent for toughening thermoset resins such as epoxy resins.

23 Claims, No Drawings

ADDUCT

BACKGROUND OF THE INVENTION

1. Field of the Invention

This invention relates to an adduct comprising a reaction product of (a) at least one divinylarene dioxide, and (b) at least one end-functionalized polymer. The adduct of this invention is useful for example as a toughening agent for thermosetting resins such as epoxy resins.

2. Description of Background and Related Art

Epoxy resins are commonly used in various applications and depending on the application, the epoxy resin may require one or more certain attributes or properties.

For example, one of the key attributes of certain thermosets is toughness for applications requiring increased toughness such as when the thermoset is used to manufacture composites. Various toughening agents used in epoxy resin compositions are known in the art such as for example core shell rubbers, particulate fillers, thermoplastics, polyurethanes and rubbers.

Carboxylic acid-terminated acrylonitrile butadiene copolymer (CTBN) is known in the art as a toughening agent for epoxy resins. The CTBN toughening agent is typically added to an epoxy resin composition as a single component or as an epoxy-CTBN adduct.

SUMMARY OF THE INVENTION

While epoxy-CTBN adducts are known in the prior art; heretofore, a divinylarene dioxide-CTBN adduct has not been prepared prior to the present invention; for example, a divinylarene dioxide-CTBN adduct having a lower viscosity than previously prepared epoxy-CTBN adducts. Toughener adducts having low viscosities are advantageous because such adducts are easier to process with thermoset resins.

One embodiment of the present invention is directed to an adduct including a reaction product of (a) at least one divinylarene dioxide, and (b) at least one end-functionalized polymer.

In one preferred embodiment, the adduct of the present invention may be used as a toughening agent for toughening epoxy resins. For example, the first component of the adduct, includes a divinylarene dioxide, such as divinylbenzene dioxide, (DVBDO) including isomers thereof such as 1,4-di(oxiran-2-yl)benzene and 1,3-di(oxiran-2-yl)benzene. The at least one end-functionalized polymer, the second reactant for forming the adduct, may include for example an end-functionalized elastomer such as the aforementioned carboxylic acid-terminated acrylonitrile butadiene copolymer (CTBN).

Another embodiment of the present invention is directed to a process for preparing the above adduct.

Still another embodiment of the present invention is directed to a composition or formulation including the above adduct.

Yet another embodiment of the present invention is directed to a process for preparing the above composition or formulation including the above adduct.

DETAILED DESCRIPTION OF THE INVENTION

"End-functionalized polymer" herein means a polymer compound, a copolymer compound or a mixture of two or more of such compounds, wherein the polymer, copolymer or mixture thereof has a functional group such as a carboxylic acid, an amine, or a mercaptan group on at least one terminal end of the polymer or copolymer.

A "polymer" or "copolymer" herein means a compound generally having an average number molecular weight from 500 to about 300,000 g/mol and a glass transition temperature ($T_g$) of below 0° C.

In its broadest scope, the present invention includes an embodiment directed to an adduct including a reaction product of (a) at least one divinylarene dioxide, and (b) at least one end-functionalized polymer.

In one embodiment, the divinylarene dioxide, component (a), useful in the present invention may comprise, for example, any substituted or unsubstituted arene nucleus bearing one or more oxirane groups in any ring position. In one preferred embodiment, the arene portion of the divinylarene dioxide, for example, may consist of benzene, substituted benzenes, (substituted) ring-annulated benzenes or homologously bonded (substituted) benzenes, or mixtures thereof. The divinylbenzene portion of the divinylarene dioxide may be ortho, meta, or para isomers or any mixture thereof. Additional substituents may consist of $H_2O_2$-resistant groups including saturated alkyl, aryl, halogen, nitro, isocyanate, or RO— (where R may be a saturated alkyl or aryl). Ring-annulated benzenes may consist of naphthlalene, tetrahydronaphthalene, and the like. Homologously bonded (substituted) benzenes may consist of biphenyl, diphenylether, and the like.

The divinylarene dioxide used for preparing the adduct of the present invention may be illustrated generally by general chemical Structures I-IV as follows:

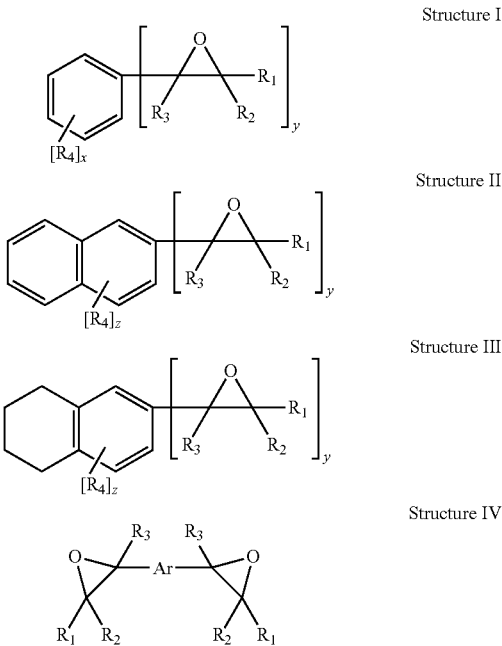

In the above Structures I, II, III, and IV of the divinylarene dioxide comonomer of the present invention, each $R_1$, $R_2$, $R_3$ and $R_4$ individually may be hydrogen, an alkyl, cycloalkyl, an aryl or an aralkyl group; or a $H_2O_2$-resistant group including for example a halogen, a nitro, an isocyanate, or an RO group, wherein R may be an alkyl, aryl or aralkyl; x may be an integer of 0 to 4; y may be an integer greater than or equal to 2; x+y may be an integer less than or equal to 6; z may be an integer of 0 to 6; and z+y may be an integer less than or equal to 8; and Ar is an arene fragment including for example, 1,3-phenylene group. In addition, R4 can be a reactive group(s) including epoxide, isocyanate, or any reactive group and Z can be an integer from 0 to 6 depending on the substitution pattern.

In one embodiment, the divinylarene dioxide used in the present invention may be produced, for example, by the process described in U.S. Patent Provisional Application Ser. No. 61/141,457, filed Dec. 30, 2008, by Marks et al., incorporated herein by reference. The divinylarene dioxide compositions that are useful in the present invention are also disclosed in, for example, U.S. Pat. No. 2,924,580, incorporated herein by reference.

In other embodiments, the divinylarene dioxide useful in the present invention may comprise, for example, divinylbenzene dioxide, divinylnaphthalene dioxide, divinylbiphenyl dioxide, divinyldiphenylether dioxide, and mixtures thereof.

In a preferred embodiment of the present invention, the divinylarene dioxide used in preparing the adduct of the present invention may be for example divinylbenzene dioxide (DVBDO). Most preferably, the divinylarene dioxide component that is useful in the present invention includes, for example, a divinylbenzene dioxide as illustrated by the following chemical formula of Structure V:

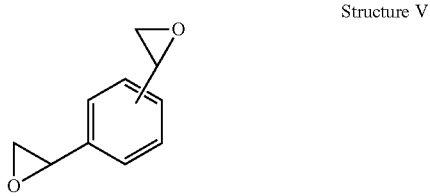

Structure V

The chemical formula of the above DVBDO compound may be as follows: $C_1H_{10}O_2$; the molecular weight of the DVBDO is about 162.2; and the elemental analysis of the DVBDO is about: C, 74.06; H, 6.21; and O, 19.73 with an epoxide equivalent weight of about 81 g/mol.

Divinylarene dioxides, particularly those derived from divinylbenzene such as for example DVBDO, are class of diepoxides which have a relatively low liquid viscosity but a higher rigidity and crosslink density than conventional epoxy resins.

Structure VI below illustrates an embodiment of a preferred chemical structure of DVBDO useful in the present invention:

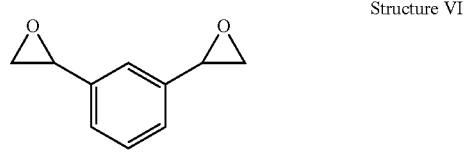 [SMILES: c1cc(C2CO2)cc(C2CO2)c1]

Structure VI

Structure VII below illustrates another embodiment of a preferred chemical structure of DVBDO useful in the present invention:

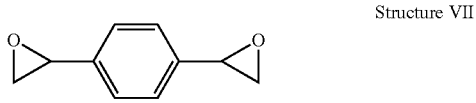

Structure VII

When DVBDO is prepared by the processes known in the art, it is possible to obtain one of three possible isomers: ortho, meta, and para. Accordingly, the present invention includes a DVBDO illustrated by any one of the above Structures I-VII individually or as a mixture thereof. Structures VI and VII above show the meta isomer (1,3-DVBDO) and the para isomer (1,4-DVBDO) of DVBDO, respectively. The ortho isomer is rare; and usually DVBDO is mostly produced generally in a range of from about 9:1 to about 1:9 ratio of meta isomer (Structure VI) to para isomer (Structure VII). The present invention preferably includes as one embodiment a range of from about 6:1 to about 1:6 ratio of Structure VI to Structure VII, and in other embodiments the ratio of Structure VI to Structure VII may be from about 4:1 to about 1:4 or from about 2:1 to about 1:2.

In yet another embodiment of the present invention, the divinylarene dioxide may contain quantities (such as for example less than about 20 weight percent (wt %)) of substituted arenes. The amount and structure of the substituted arenes depend on the process used in the preparation of the divinylarene precursor to the divinylarene dioxide. For example, divinylbenzene prepared by the dehydrogenation of diethylbenzene (DEB) may contain quantities of ethylvinylbenzene (EVB) and DEB. Upon reaction with hydrogen peroxide, EVB produces ethylvinylbenzene monoxide while DEB remains unchanged. The presence of these compounds can increase the epoxide equivalent weight of the divinylarene dioxide to a value greater than that of the pure compound but can be utilized at levels of 0 to 99% of the epoxy resin portion.

In one embodiment, the divinylarene dioxide useful in the present invention comprises, for example, DVBDO a liquid epoxy resin having, a low viscosity. The viscosity of the divinylarene dioxide used in the present invention ranges generally from about 0.001 Pa s to about 0.1 Pa s, preferably from about 0.01 Pa s to about 0.05 Pa s, and more preferably from about 0.01 Pa s to about 0.025 Pa s, at 25° C.

In general, the molar ratio of the divinylarene dioxide used in the present invention as the epoxy resin portion of the adduct reaction product composition to the end-functionalized polymer used in the present invention may range generally from about 0.5 to about 1000 in one embodiment; from about 1 to about 500 in another embodiment; from about 4 to about 300 in still another embodiment; and from about 5 to about 200 in yet another embodiment. In one preferred embodiment, of the epoxy resin to the end-functionalized polymer in the adduct composition may be from about 2 to about 200.

In the broadest terms of the present invention, one embodiment of the end-functionalized polymer used as component (b) may include any polymer that has an end functional group that reacts with the divinylarene dioxide, component (a). The end functional group may be for example a carboxylic acid, an amine, or mercaptan group. For example, the end-functionalized polymer component (b) useful in the present invention may comprise a CTBN; an amine-terminated acrylonitrile butadiene copolymer (ATBN); a carboxy-terminated polybutadiene; a carboxy-terminated polysiloxane; a carboxy terminated polyethylene; a carboxy terminated polyacrylate; a carboxy terminated poly(styrene-butadiene); and mixtures thereof. The end-functionalized polymer is preferably CTBN. The molar ratio of the DVBDO to the end-functionalized polymer is as described below.

The process for preparing the adduct of the present invention includes admixing (a) a divinylarene dioxide such as for example divinylbenzene dioxide; and (b) an end-functionalized polymer, under reaction conditions to form a divinylarene dioxide—end-functionalized polymer adduct reaction product. Thus, the adduct of the present invention is formed by reacting (a) at least one divinylarene dioxide, and (b) at least one end-functionalized polymer. For example, one preferred embodiment includes a DVBDO-CTBN adduct compound which is formed by reacting (a) DVBDO and (b) CTBN.

An example of a reaction scheme illustrating a reaction synthesis scheme for preparing a DVBDO-CTBN adduct may be shown as Scheme I as follows:

Scheme I

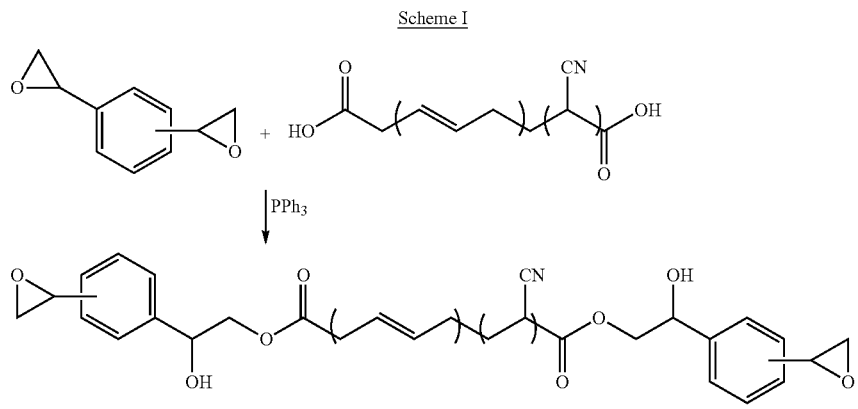

Optional components which can be used in the reaction mixture for preparing the adduct may include for example a catalyst. Examples of a suitable catalyst that may be used in the present invention may include one or more the following compounds: triphenyl phosphine, acids, Lewis acids, amines, phosphonium salts and mixtures thereof.

In general, the concentration of the optional catalyst which may be used in the present invention may include for example a molar ratio of the end-functionalized polymer to the catalyst of from about 0.0001 to about 4 in one embodiment; from about 0.001 to about 2 in another embodiment; from about 0.005 to about 1 in still another embodiment; and from about 0.005 to about 1 in yet another embodiment.

Another optional component which can be used in the reaction mixture for preparing the adduct may include for example a solvent. Examples of a suitable solvent that may be used in the present invention may include one or more of the following solvents: ethyl acetate, tetrahydrofuran, methylene chloride, benzene and mixtures thereof.

In general, the concentration of the optional solvent which may be used in the present invention may be from 0 wt % to about 90 wt % in one embodiment; from about 0.001 wt % to about 80 wt % in another embodiment; from about 0.01 wt % to about 70 wt % in still another embodiment; and from about 0.1 wt % to about 50 wt % in yet another embodiment.

The above components, and any optional components, may be mixed in any order. All the components for preparing the adduct are typically mixed and homogeneously dispersed at a temperature enabling the preparation of an effective adduct. The temperature during the mixing of the components may be generally from about 25° C. to about 150° C., preferably from about 35° C. to about 140° C., and more preferably from about 40° C. to about 120° C.

The above components, and any optional components, may be mixed and reacted together at the above described reaction temperature for a period of time enabling the preparation of an effective adduct. The reaction time may be generally from about 20 minutes to about 2 days, preferably from about 1 hour to about 24 hours, and more preferably from about 2 hours to about 12 hours.

One of the advantageous properties of the adduct of the present invention includes a Tg sufficient to provide the adduct with an elastomeric particle size to be useful as a toughening agent. The Tg of the adduct of the present invention generally is less that about 0° C.; preferably, from about −80° C. to less than about 0° C.; more preferably, from about −70° C. to less than about 0° C.; and even more preferably, from about −60° C. to less than about 0° C. as measured by differential scanning calorimetry (DSC).

In another preferred embodiment, the viscosity of the adduct of the present invention generally is less than about 400 Pa-s; preferably, from about 0.1 Pa-s to less than about 400 Pa-s; more preferably, from about 0.2 Pa-s to about 300 Pa-s; even more preferably, from about 0.5 Pa-s to about 275 Pa-s; and most preferably, from about 0.6 Pa-s to about 250 Pa-s as measured at 25° C. by an AR2000 rheometer known in the art.

Another of the advantageous properties of the adduct of the present invention is the capability of the adduct to phase separate during cure. This phase separation phenomena during cure of a formulation containing the adduct is important because soft particles are formed to provide toughening of the cured formulation. For example, when the adduct is used in a curable composition including a thermoset such as an epoxy resin and a curing agent, the adduct phase separates during cure of the curable composition to form particles in a size range of generally from about 50 μm to about 0.1 μm; preferably, from about 20 μm to about 0.2 μm; more preferably, from about 10 μm to about 0.3 μm; even more preferably, from about 8 μm to about 0.4 μm; and most preferably, from about 5 μm to about 0.5 μm. In a preferred embodiment, when the adduct is used as a toughening agent, one preferred particle size range may be from about 5 μm to about 0.5 μm. The particle size of the adduct may be measured by image analysis of a scanning electron microscopy image as known in the art.

Because of the excellent properties of the adduct product of the present invention, the adduct may be useful in various end use applications. Illustrative, and not to be limited thereby, the adduct may be used, for example, as a toughening agent; as a flame retardant; or as a mechanical modifier, among other applications for various thermoset resins such as epoxy resins. In addition, in one embodiment, the adduct may first be dissolved in a thermosetting resin such as an epoxy resin other than the divinylarene dioxide, prior to using the adduct in an application or in preparation for its use in an application.

As an illustration of the present invention, the adduct may be useful as a toughening agent for toughening thermoset resins when said thermoset resins are cured and when the cured product is, for example, a composite or a coating. For example, in manufacturing a composite from a curable epoxy resin composition, formulation or mixture, the present invention adduct is advantageously added to the epoxy resin mixture as a toughening agent for toughening the epoxy resin. When the mixture with the toughening agent is cured, the adduct phase separates during cure resulting in a toughened cured epoxy resin thermoset.

In one embodiment, for example, a divinylarene dioxide and a CTBN forms an epoxy-functionalized polymer or copolymer adduct that may be used, for example as a toughening agent for toughening an epoxy thermoset resin, which in turn, can be used for manufacturing various toughened articles such as composites. The curable epoxy resin mixture with the present invention adduct, when cured, is adapted for making, for example, a composite with an increased toughness compared to a composite made from a curable epoxy resin mixture without the present invention adduct, as measured for example, by double cantilever beam fracture toughness testing in accordance with ASTM D 5528.

The composite made from a curable composition containing the adduct of the present invention, may be used in manufacturing for example windmill blades, aerospace applications, underfill encapsulants, electrical laminates and other applications where composites are used in the known art.

As aforementioned, in one embodiment, the adduct of the present invention may be useful as a toughening agent for toughening a thermoset resin such as an epoxy resin. In this embodiment, a curable thermoset resin composition containing toughening agent adduct as one component of the composition is prepared and cured. For example, the curable composition may comprise (i) an epoxy resin other than the adduct of the present invention; (ii) a curing agent; (iii) an adduct of the present invention as described above; (iv) optionally a curing reaction catalyst; (iv) optionally, a filler; and (v) optionally, other commonly known additives used in curable epoxy resin compositions. The toughened epoxy resin formulations which are toughened by the adduct of the present invention may be used in thermoset systems where conventional epoxy resins are used.

In one preferred embodiment, the epoxy resin compound useful in preparing, a curable epoxy resin composition or formulation, may comprise for example, any epoxy resin such as DVBDO; bisphenol A type resins commercially known in the art such as D.E.R. 331, D.E.R. 332, D.E.R. 354, and D.E.R. 383 (D.E.R. is a trademark of The Dow Chemical Company); and other conventional epoxy resins commercially known in the art.

In the broadest terms of the present invention, a hardener (curing agent or cross-linker) or a curing agent blend is used in the curable composition of the present invention. Generally, any hardener known in the art which is appropriate for curing thermoset resins such as epoxy resins may be used. The hardener of choice may depend on the application requirements. The hardener useful in the present invention may include, for example, but are not limited to, dicyandiamide, substituted guanidines, phenolic, amino, benzoxazine, anhydrides, amido amines, polyamides, polyamines, aromatic amines, polyesters, polyisocyanates, polymercaptans, urea formaldehyde resins, melamine formaldehyde resins, and mixtures thereof.

The concentration of the hardener used in the curable composition will depend on stoichiometric considerations (molar ratio). Generally, the molar ratio of epoxy to hardener may be from about 0.25 to about 4; more preferably, from about 0.5 to about 2; and most preferably, from about 0.9 to about 1.1.

The adduct of the present invention used in the thermoset resin such as the epoxy resin composition is as described above. In general, the concentration of the adduct used in the curable composition may range generally from about 0.01 wt % to about 40 wt % in one embodiment; from about 0.02 wt % to about 20 wt % in another embodiment; from about 0.05 wt % to about 15 wt % in still another embodiment; and from about 1 wt % to about 10 wt % in yet another embodiment.

Various optional compounds may be added to the curable composition of the present invention. For example, in one embodiment, an optional catalyst may be used in the epoxy resin composition of the present invention. Generally, any homogeneous or heterogeneous catalyst known in the art which is appropriate for facilitating the reaction between a thermoset such as an epoxy resin and a hardener may be used. The catalyst may include for example, but are not limited to, imidazoles, tertiary amines, phosphonium complexes, Lewis acids, or Lewis bases, transition metal catalysts, and mixtures thereof.

The catalyst useful in the present invention may include for example a Lewis acid such as boron triflouride complexes; Lewis bases such as tertiary amines for example diazabicycloundecene and 2-phenylimidazole; quaternary salts such as tetrabutylphosphonium bromide and tetraethylammonium bromide; and organoantimony halides such as triphenylantimony tetraiodide and triphenylantimony dibromide; and mixtures thereof.

The concentration of the catalyst when used in the composition is generally between about 0.05 wt % to about 10 wt %; preferably, between about 0.1 wt % to about 5 wt %; and more preferably between about 0.15 wt % to about 1 wt %, based on the weight of the resin composition. The catalyst level can be adjusted to allow adequate processing in the final application.

Other optional additives useful in the curable composition containing the adduct of the present invention may also be used including any additives that are components normally used in resin formulations known to those skilled in the art. For example, the optional components may comprise compounds that can be added to the curable composition to enhance application properties (e.g. surface tension modifiers or flow aids); reliability properties (e.g. adhesion promoters); reaction rate; selectivity of the reaction, and/or catalyst lifetime. Optional additives useful in the present invention may include for example, other resins such as epoxy resins that are different from the divinylarene dioxide, component (a); adhesion promoters, wetting agents; dispersing agents; surface modifiers, air release additives, mold release agents, pigments; flow additives; diluents; stabilizers; fillers; plasticizers; catalyst de-activators; flame retardants, solvents, and the like; and mixtures thereof.

The concentration of the optional additives when used in the curable resin composition of the present invention may range generally from 0 wt % to about 99 wt %; preferably, from about 0.001 wt % to about 95 wt %; more preferably, from about 0.01 wt % to about 10 wt %; and most preferably, from about 0.05 wt % to about 5 wt %, based on the weight of the resin composition.

The process for preparing the above curable epoxy resin composition, formulation, or mixture includes the process step of blending the toughening adduct with the formulation containing the hardener, the epoxy resin and the other optional additives described above. Then the curable composition is cured by process conditions well known in the art for curing thermoset resins such as epoxy resins.

In a preferred embodiment, the adduct phase separates during cure of the curable epoxy resin composition. The use of the adduct as a toughening agent increases the toughness of the resulting cured epoxy resin. The toughness of the epoxy resin as measured by compact tension testing (ASTM D 5045-93) may be generally from about 0.5 MPa m$^{1/2}$ to about 4.0 MPa m$^{1/2}$; preferably, from about 0.7 MPa m$^{1/2}$ to about 3.5 MPa m$^{1/2}$; and more preferably, from about 1.2 MPa m$^{1/2}$ to about 3.0 MPa m$^{1/2}$.

EXAMPLES

The following examples and comparative examples further illustrate the present invention in detail but are not to be construed to limit the scope thereof.

In the following Examples, various terms and designations are used such as for example: "DVBDO" stands for divinylbenzene dioxide; "CTBN" stands for carboxy terminated acrylonitrile butadiene copolymer; "LER" stands for liquid epoxy resin; "MTHPA" stands for methyl tetrahydro phthalicanhydride; "1MI" stands for 1 methyl imidazole; "VARTM" stands for vacuum assisted resin transfer molding; and DER™ 383 is an epoxy resin having an EEW ranging from 176-183 and commercially available from The Dow Chemical Company.

In the following Examples, standard analytical equipment and methods are used such as for example, compact tension testing as described below.

Compact Tension Fracture Toughness Testing

Mode I Critical Stress Intensity ($K_{1c}$) values were obtained for cured compositions via compact tension testing. $K_{1c}$ values reported are an average of several specimens as described below and are used as a metric of toughness of the material.

Cured samples were tested for Mode I fracture toughness using the compact tension specimen geometry in accordance with ASTM D 5045-93. Samples were water jet cut to appropriate dimensions. Water jet cutting was used to avoid cracking and leaving the test specimens with almost no residual stress. A starter crack was very carefully introduced by gently tapping a razor blade cooled with dry ice into the chevron notch in the specimen. Specimens were loaded on an electromechanical Instron 5566 test frame by means of a clamp and dowel pin and loaded at a constant displacement rate. Load and stroke data were recorded during the test using a computer controlled data acquisition system. About 5 specimens were tested for each sample.

Notched Three-Point Bend Fracture Toughness Testing

Fracture toughness measurements were performed on the basis of the linear elastic fracture mechanics (LEFM) approach. A single edge-notch three-point-bending (SEN-3PB) can be used to obtain the Mode I Critical Stress Intensity ($K_{IC}$) of the neat epoxy and CTBN toughened epoxy in accordance with ASTM D5045 method. The test was performed on an Instron machine at a testing speed of 0.02 inches/minute (0.508 mm/minute). The initial starter crack was carefully generated by gently tapping with a fresh razor blade chilled with dry ice. At least five specimens were used to determine the $K_{ic}$ value of the samples. The critical stress intensity factor was calculated using the methodology defined in ASTM D5045.

Titration to Monitor Acid Consumption During Synthesis of Epoxide 12-CTBN Adduct An epoxy resin is dissolved in methylene chloride and titrated with standardized perchloric acid ($HClO_4$) in the presence of excess tetraethylammonium bromide (TEAB). Hydrogen bromide (HBr) is generated in situ when $HClO_4$ in acetic acid is added to the quaternary ammonium halide (TEAB). The hydrogen bromide, which is produced stoichiometrically by the perchloric acid, reacts one-to-one with the epoxy to rapidly open the oxirane ring and form a bromohydrin. Thus, the quantity of perchloric acid consumed is a measure of the epoxy content. Prior to the equivalence point, the resulting solution contains little hydrogen bromide since the HBr reacts with the epoxide. Once all the epoxide is consumed, the presence of a small excess of HBr causes the pH electrode potential (mV) to increase very quickly thus marking the endpoint of the titration. This method may give EEW values slightly off of the exact value due to side reactions that occur with Epoxide 12 during the titration.

Example 1

A master batch of DVBDO-CTBN adduct was prepared by reacting DVBDO (25.08 g, 6.587 mmol, 1 equiv), PPh$_3$ (0.1 g, 0.381 mmol, 0.06 equiv) and CTBN (25.03 g, 154.633 mmol, 24 equiv) at 80° C. for 7 hours. The reaction was monitored by the disappearance of acid via titration with perchloric acid and tetraethylammonium bromide. The viscous orange liquid was used without further purification. The EEW of the adduct was determined to be 189 as measured by titration with perchloric acid ($HClO_4$) in the presence of excess tetraethylammonium bromide (TEAB). The resulting adduct product was 50 wt % CTBN.

In a master batch of DVBDO-CTBN adduct containing for example 40 wt % CTBN, the viscosity of the master batch is generally low (e.g., about 3 Pa-s) compared to the viscosity of a conventional liquid epoxy resin (LER)-CTBN adduct which is generally about 250 Pa-s at the same concentration. Because of the low viscosity of the master batch containing CTBN, the rubber (CTBN) additive loading level in a final formulation can be increased. For example, a formulation containing an epoxy resin such as DER™ 383 (trademark of The Dow Chemical Company) and a curing agent such as methyl tetrahydro phthalicanhydride (MTHPA) catalyzed by 1 methyl imidazole (1MI) can be prepared using the adduct of the present invention. The implications of this are two fold: (1) viscosity of the final formulation is still maintained well within range for filament winding (e.g., <2 Pa-s) while getting more toughening agent into the formulation; and (2) in the case of infusion or vacuum assisted resin transfer molding (VARTM) where the required formulation viscosity is very low (e.g., <1 Pa-s), it is difficult to use conventional LER-CTBN adducts even at amounts of 5 wt % before rendering the formulation unusable from a processing point of view. Hence in this case, the DVBDO-CTBN adduct of the present invention may be advantageously used in infusion formulations.

A DVBDO-CTBN adduct master batch having a concentration of for example 50 wt % CTBN in DVBDO can be prepared as described above. On the other hand, a 50 wt % concentration of CTBN in a conventional LER is difficult to achieve, in the case of an LER-CTBN adduct, due to its high viscosity. However, since a DVBDO-CTBN adduct has a lower viscosity, the adduct is easier to use and higher levels of the rubber can be added to the final formulation, enabling a lower viscosity of the final formulation and increased toughness of the cured formulation.

In addition, since the viscosity of the DVBDO-CTBN adduct prepared is low, other forms of elastomeric and inorganic mineral based fillers such as core-shell rubber, nanosilicas and the like can be added to the formulation in order to exploit the power of hybrid toughening mechanisms while still maintaining processability for composite fabrication technologies such as VARTM, filament winding, pultrusion and resin transfer molding (RTM).

What is claimed is:

1. An adduct comprising a reaction product of
   (a) at least one divinylbenzene dioxide, wherein the divinylbenzene dioxide is a composition having a purity of greater than 5 weight percent; and
   (b) at least one end-functionalized polymer, wherein the molar ratio of the at least one end-functionalized polymer to the at least one divinylbenzene dioxide is from about 0.01:1 to about 10,000:1.

2. The adduct of claim 1, wherein the at least one end-functionalized polymer comprises at least one functionally terminated poly(butadiene-acrylonitrile) copolymer.

3. The adduct of claim 1, wherein the at least one end-functionalized polymer comprises an end-functionalized acrylonitrile butadiene copolymer.

4. The adduct of claim 1, wherein the at least one end-functionalized polymer comprises a carboxylic acid-terminated acrylonitrile butadiene copolymer.

5. The adduct of claim 1, wherein the at least one end-functionalized polymer comprises a carboxy-terminated polybutadiene.

6. The adduct of claim 1, wherein the at least one end-functionalized polymer comprises an end-functionalized polysiloxane.

7. The adduct of claim 1, wherein the at least one end-functionalized polymer is selected from the group consisting of a carboxy-terminated butadiene acrylonitrile copolymer, an amine-terminated butadiene acrylonitrile copolymer; and mixtures thereof.

8. The adduct of claim 1, wherein the at least one end-functionalized polymer has a glass transition temperature ($T_g$) of below about 0° C.

9. The adduct of claim 1, wherein the molar ratio of the at least one end-functionalized polymer to the at least one divinylarene dioxide is from about 1:1 to about 2,000:1.

10. The adduct of claim 1, wherein the adduct comprises a polymer-divinylbenzene dioxide adduct, a copolymer-divinylbenzene dioxide adduct, or mixtures thereof.

11. The adduct of claim 1, wherein the adduct comprises a carboxy-terminated butadiene acrylonitrile-divinylbenzene dioxide adduct, an amine-terminated butadiene acrylonitrile-divinylbenzene dioxide adduct, or mixtures thereof.

12. A process for preparing an adduct comprising reacting
   (a) at least one divinylbenzene dioxide, wherein the divinylbenzene dioxide is a composition having a purity of greater than 5 weight percent; and
   (b) at least one end-functionalized polymer; wherein the molar ratio of the at least one end-functionalized polymer to the at least one divinylbenzene dioxide is from about 0.01:1 to about 10,000:1.

13. A composition comprising (a) the adduct of claim 1, and (b) a thermosetting resin.

14. The composition of claim 13, wherein the thermosetting resin comprises an epoxy resin.

15. A process for preparing a composition comprising admixing (a) the adduct of claim 1, and (b) a thermosetting resin.

16. A curable composition comprising (a) the adduct of claim 1, (b) a thermosetting resin, and (c) a curing agent.

17. The curable composition of claim 16, wherein the thermosetting resin comprises an epoxy resin.

18. The curable composition of claim 16, wherein the curing agent comprises an amine, an anhydride, a phenolic compound or mixtures thereof.

19. The curable composition of claim 16, wherein the concentration of the adduct in the composition is from about 0.01 weight percent to about 50 weight percent.

20. A process for preparing a curable composition comprising admixing (a) the adduct of claim 1, (b) a thermosetting resin, and (c) a curing agent.

21. A cured article comprising a product prepared by curing the curable composition of claim 16; wherein the cured article has a fracture toughness of from about 0.5 MPa m$^{1/2}$ to about 4.0 MPa m$^{1/2}$ at a temperature of 25° C.; wherein the cured article has a modulus of from about 0.001 GPa to about 50 GPa; and wherein the cured article has a glass transition temperature of from about −50° C. to about 400° C.

22. The cured article of claim 21 prepared by heating the curable composition at a temperature of from about −50° C. to about 350° C. sufficient to cure the curable composition.

23. The cured article of claim 21 comprising a composite.

* * * * *